United States Patent
Nakayama et al.

(10) Patent No.: US 8,407,799 B2
(45) Date of Patent: Mar. 26, 2013

(54) SOFTWARE BEHAVIOR MODELING DEVICE, SOFTWARE BEHAVIOR MODELING METHOD, SOFTWARE BEHAVIOR VERIFICATION DEVICE, AND SOFTWARE BEHAVIOR VERIFICATION METHOD

(75) Inventors: Takehiro Nakayama, Setagaya-ku (JP); Yuka Ikebe, Yokohama (JP); Atsushi Takeshita, Yokohama (JP); Kazuhiko Kato, Tsukuba (JP); Hirotake Abe, Toyohashi (JP); Katsuhiro Suzuki, Takatsuki (JP)

(73) Assignee: NTT DoCoMo, Inc., Tokyo (JP)

( * ) Notice: Subject to any disclaimer, the term of this patent is extended or adjusted under 35 U.S.C. 154(b) by 383 days.

(21) Appl. No.: 12/593,376

(22) PCT Filed: Mar. 28, 2008

(86) PCT No.: PCT/JP2008/056177
§ 371 (c)(1),
(2), (4) Date: Jan. 22, 2010

(87) PCT Pub. No.: WO2008/117872
PCT Pub. Date: Oct. 2, 2008

(65) Prior Publication Data
US 2011/0154487 A1    Jun. 23, 2011

(30) Foreign Application Priority Data
Mar. 28, 2007 (JP) ................................. 2007-085598

(51) Int. Cl.
*H04L 29/06* (2006.01)

(52) U.S. Cl. ............................................ 726/25; 726/22
(58) Field of Classification Search ................... 726/22, 726/23, 24, 25; 717/126, 131, 132, 133
See application file for complete search history.

(56) References Cited

U.S. PATENT DOCUMENTS
2003/0074605 A1   4/2003 Morimoto et al.
(Continued)

FOREIGN PATENT DOCUMENTS
JP    2003 122599    4/2003
JP    2004 126854    4/2004
(Continued)

OTHER PUBLICATIONS

Ikebe, Yuka, et al., "Anomaly Detection Software for Mobile Terminals", IPSJ SIG Technical Report, vol. 2006, No. 120, pp. 39-46, Nov. 16, 2006, (with English abstract).

(Continued)

*Primary Examiner* — Edward Zee
(74) *Attorney, Agent, or Firm* — Oblon, Spivak, McClelland, Maier & Neustadt, L.L.P.

(57) ABSTRACT

A software behavior modeling device which forms a model of a behavior of software includes; an event information acquisition unit configured to acquire event information indicating a specific event which occurs during execution of the software; a stack information acquisition unit configured to acquire stack information stored in a call stack at a time of occurrence of the specific event; a score setting unit configured to set a score in accordance with a storage location in which each element included in the stack information is stored in the call stack; and a model generating unit configured to form a model of a relationship between the specific event and the element by using the score, and to generate a behavior model of the software.

10 Claims, 4 Drawing Sheets

U.S. PATENT DOCUMENTS

| | | |
|---|---|---|
| 2006/0010337 A1 | 1/2006 | Suzuki |
| 2006/0085854 A1* | 4/2006 | Agrawal et al. ............... 726/23 |
| 2006/0101413 A1 | 5/2006 | Kinno et al. |
| 2007/0083933 A1* | 4/2007 | Venkatapathy et al. ........ 726/25 |

FOREIGN PATENT DOCUMENTS

| | | |
|---|---|---|
| JP | 2006 31109 | 2/2006 |
| JP | 2006 53788 | 2/2006 |
| JP | 2006 146600 | 6/2006 |
| JP | 2006 268775 | 10/2006 |
| JP | 2006 330864 | 12/2006 |

OTHER PUBLICATIONS

Suzuki, Katsuhiro et al., "Performance Improvement of Anomaly Detection System by Simplifying Call Stack Inspection", The Institute of Electronics, Information and Communication Engineers, IEICE Technical Report, vol. 106, No. 175, pp. 183-190, Jul. 13, 2006, (with English abstract).

Kinno, Akira et al., "Anomaly Detection Technique for Mobile Terminals", IPSJ SIG Technical Report, vol. 2006, No. 44, pp. 1-8, May 12, 2006, (with English abstract).

Ando, Ruo et al., "Improced exception handler for real-time overflow prevention", IPSJ SIG Technical Report, vol. 2005, No. 33, pp. 333-337, Mar. 23, 2005, (with English abstract).

Abe, Hirotake "Optimization of Intrusion Detection System Based on Static Analyses", Information Processing Society of Japan, IPSJ Symposium Series, vol. 2003, No. 20, pp. 7-16, Dec. 11, 2003, (with English abstract).

Feng, Henry Hanping et al., "Anomaly Detection Using Call Stack Information", The Proc. of IEEE Symposium on Security and Privacy, 14 Pages, (2003).

Office Action issued on Jul. 12, 2011 in the corresponding Chinese Patent Application No. 200880010524.1 (with English Translation).

Japanese Office Action—mailing date of Jun. 5, 2012, issued in corresponding Japanese Patent Application (with English translation.

* cited by examiner

| Sys1 | 0x80000001 0x80000123 0x80000345 |
| Sys2 | 0x80000001 0x80000123 0x80000456 0x80000567 |
| Sys2 | 0x80000001 0x80000321 0x80000654 |
| | ⋮ |

SOFTWARE BEHAVIOR MODELING DEVICE, SOFTWARE BEHAVIOR MODELING METHOD, SOFTWARE BEHAVIOR VERIFICATION DEVICE, AND SOFTWARE BEHAVIOR VERIFICATION METHOD

TECHNICAL FIELD

The present invention relates to a software behavior modeling device and software behavior modeling method for forming a model of the behavior of software and a software behavior verification device and software behavior verification method for verifying the behavior of software.

BACKGROUND ART

Computers, such as PCs, workstations, servers, routers, cell phones, and PDAs possibly receive attacks from the outside of the computers or the inside of the computers. Typical attacks include an attack which exploits the vulnerabilities of software executed on a computer. Attackers send a code for exploiting the vulnerabilities of software to a computer, thereby taking control of processes included in the software executed on the computer. The attackers utilize the authority of the processes under their control to perform invalid operation.

Against this background, there has been known an anomaly detection system which detects an attack exploiting the vulnerabilities of software, in particular, an attack unknown to the computer.

Specifically, in the anomaly detection system, a model of the normal behavior of software is formed in advance and the behavior model thus formed is stored. During execution of the software, the anomaly detection system determines if the behavior of the software is different from the behavior model.

The attackers use a system call in which a process requests a kernel to perform important processing so as to cause a computer to operate an intended operation. Accordingly, it is important to verify the validity of a system call in monitoring the behavior of software.

In response to this, there has been proposed a verification method for verifying the validity of a system call during execution of software. However, it has been found that an attack can be made while a system call sequence is kept normal. Thus, in order to improve verification accuracy, there has been proposed a method which uses not only a system call but also a return address for verification. This verification method utilizes the status of a call stack in which return addresses and the like are stored. Specifically, this verification method includes stages of training the behavior of software and verifying the behavior of the software (for example, Non-patent literature 1).

At the stage of training the behavior of software, the software is normally executed in advance to generate a behavior model of the software.

Specifically, when a system call occurs, the status of the call stack (the sequence of return addresses stored in the call stack) is acquired and simultaneously a value of a program counter is acquired. A virtual stack list is generated, that the sequence of the return addresses and the value of the program counter are recorded. Subsequently, acquired is difference information (virtual path) between the virtual stack list generated when one system call occurs and the virtual stack list generated when another system call occurs following the one system call. Furthermore, a hash table is generated based on the virtual stack list and the difference information (virtual path). The hash table is utilized as a behavior model.

At the stage of verifying the behavior of the software, when a system call occurs during execution of the software, a hash table is generated in the same manner as in the stage of training the behavior of the software. Subsequently, matching is performed between the hash table generated at the stage of training the behavior of the software and the hash table generated during execution of the software. The system call is authorized when the hash tables coincide with each other, whereas it is determined that the behavior of the software is abnormal when the hash tables do not coincide with each other.

However, in the above-described verification method, a hash table has to be generated based on the virtual stack list and the difference information (virtual path). In particular, at the stage of verifying the behavior of software, a hash table has to be generated during execution of the software. Thus, a processing load on a computer becomes heavy, which results in slowing down the processing speed of the computer. In particular, it should be noted that a load of generating difference information (virtual path) for acquiring the hash table is heavy.

In addition, in Non-patent literature 1, behaviors already trained are regarded as normal and behaviors not trained yet are all regarded as abnormal. In other words, if not all the behaviors are trained, error detection possibly occurs in which even a normal behavior is determined as abnormal. To comprehensively train the normal behaviors of software is difficult in practice. Accordingly, this is considered as a problem.

Non-patent literature 1: H. Feng et al., "Anomaly Detection Using Call Stack Information," The proc. of IEEE Symposium on Security and Privacy 2003, pp. 62.

DISCLOSURE OF THE INVENTION

A first aspect of the present invention is summarized as a software behavior modeling device which forms a model of a behavior of software. The software behavior modeling device includes; an event information acquisition unit (an event information acquisition unit 110) configured to acquire event information indicating a specific event (a system call, for example) which occurs during execution of the software; a stack information acquisition unit configured to acquire stack information stored in a call stack at a time of occurrence of the specific event (a stack information acquisition unit 120); a score setting unit (a score setting unit 125) configured to set a score in accordance with a storage location in which each element (a return address, for example) included in the stack information is stored in the call stack; and a model generating unit (a model generating unit 130) configured to form a model of a relationship between the specific event and the element by using the score, and to generate a behavior model of the software.

According to the first aspect, the model generating unit 130 generates a behavior model by using scores set according to storage locations of return addresses. The accuracy in behavior modeling of the software can be increased by focusing attention on storage locations of return addresses.

Moreover, there is no need to use difference information (virtual path) like a related art. Accordingly, it is possible to reduce a processing load on the software behavior modeling device and to increase a processing speed of the software behavior modeling device.

In the first aspect of the present invention, the model generating unit extracts modeling object elements to be used for generating the behavior model from the elements stored in the call stack, and generates the behavior model by using the storage location and the score corresponding to the modeling object element.

In the first aspect of the present invention, the modeling object elements are a predetermined number of elements which are extracted in descending order from the elements stored in the call stack.

In the first aspect of the present invention, the modeling object elements are elements, whose scores are not less than a predetermined threshold, among the elements stored in the call stack.

In the first aspect of the present invention, the model generating unit forms a model of a relationship between the specific event and a processing order of the elements so as to generate the behavior model.

A second aspect of the present invention is summarized as a software behavior modeling method for forming a model of a behavior of software. The software behavior modeling method includes; a step A of acquiring event information indicating a specific event which occurs during execution of the software; a step B of acquiring stack information stored in a call stack at a time of occurrence of the specific event; a step C of setting a score in accordance with a storage location in which each element included in the stack information is stored in the call stack; and a step D of forming a model of a relationship between the specific event and the element by using the score and thereby generating a behavior model of the software.

A third aspect of the present invention is summarized as a software behavior verification device which verifies a behavior of software. The software behavior verification device includes; an event information acquisition unit (an event information acquisition unit 210) configured to acquire event information indicating a specific event which occurs during execution of the software; a stack information acquisition unit (a stack information acquisition unit 220) configured to acquire stack information stored in a call stack at a time of occurrence of the specific event; a behavior model acquisition unit (a behavior model acquisition unit 230) configured to acquire a behavior model in which a model of a relationship between the specific event and the element is formed in advance; and a behavior verification unit (a behavior verification unit 240) configured to verify if the behavior of the software is different from the behavior model, based on the specific event acquired by the event information acquisition unit and the stack information acquired by the stack information acquisition unit. The behavior model is generated by using a score set in accordance with a storage location where each element included in the stack information is stored in the call stack when the software is normally executed in advance.

According to the third aspect, the behavior verification unit uses the score which is set according to the storage location of the return address so as to determine if the behavior of the monitored software is different from the behavior model. As described above, the verification accuracy of the behavior of the software can be increased by focusing attention on the storage location of the return address.

Moreover, there is no need to use difference information (virtual path) like a related art. Accordingly, it is possible to reduce a processing load on the software behavior verification device and to improve a processing speed of the software behavior verification device.

In the third aspect, the behavior verification unit cumulatively adds the score and detects an abnormal behavior of the software based on the cumulatively added score.

The fourth aspect of the present invention is summarized as a software behavior verification method for verifying a behavior of software. The software behavior verification method includes, a step A of acquiring event information indicating a specific event which occurs during execution of the software; a step B of acquiring stack information stored in a call stack at a time of occurrence of the specific event; a step C of acquiring a behavior model in which a model of a relationship between the specific event and the element is formed in advance; and a step D of verifying if the behavior of the software is different from the behavior model, based on the specific event acquired at the step A and the stack information acquired at step B. The behavior model is generated by using a score set in accordance with a storage location where each element included in the stack information is stored in the call stack when the software is normally executed in advance. At the step D, it is verified if the behavior of the software is different from the behavior model, based on the score.

BEST MODE FOR CARRYING OUT THE INVENTION

Figures 1, 2:
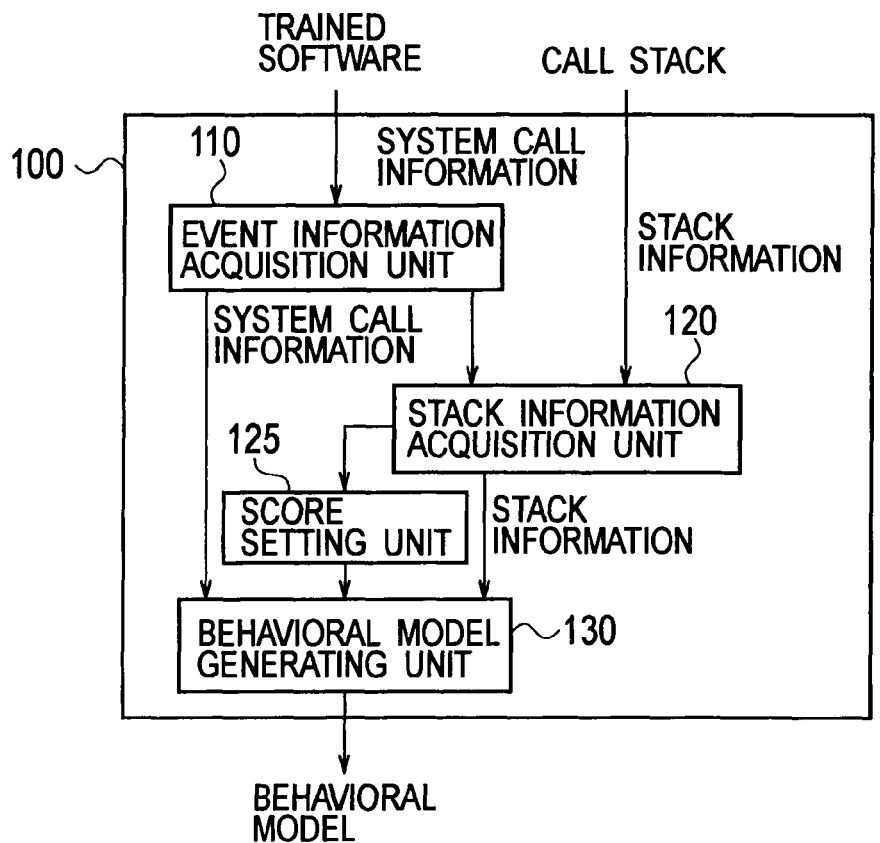
FIG. 1 is a block diagram showing the configuration of a software behavior modeling device 100 according to a first embodiment.
FIG. 2 is a view showing one example of stack information according to the first embodiment.

A software behavior modeling device and software behavior verification device according to an embodiment of the present invention are described below by referring to the drawings. In the following description of the drawings, same or similar reference numerals are given to denote same or similar portions.

It should be noted that the drawings are merely schematically shown and that their dimensional ratios and the like are different from actual ones. Thus, specific dimensions and the like should be judged by referring to the description below. Naturally, there are portions where dimensional relationships and ratios between the drawings are different.

First Embodiment

Software Behavior Modeling Device

The configuration of a software behavior modeling device according to a first embodiment is described below by referring to the drawings. FIG. 1 is a block diagram showing the configuration of a software behavior modeling device 100 according to the first embodiment.

As shown in FIG. 1, the software behavior modeling device 100 forms a model of the normal behavior of trained software (program) to generate a behavior model of the software. Specifically, the software behavior modeling device 100 includes an event information acquisition unit 110, a stack information acquisition unit 120, a score setting unit 125, and a behavior model generating unit 130.

During execution of the trained software, the event information acquisition unit 110 acquires event information indicating a specific event which is issued by each process included in the trained software. For example, in the following description, an example in which a system call occurs as a specific event is described. Here, in the example, the event information acquisition unit 110 acquires system call information indicating a system call as event information. The system call is a command that is issued when a process included in software submits a request for executing important processing to an operation system (kernel).

The stack information acquisition unit 120 acquires stack information which is information stored in a call stack. The stack information is one in which multiple return addresses are recorded in the order of being stored in the call stack. The return address is an address of a process to which processing should be returned when a subroutine called during execution of the process is finished.

Here, in the first embodiment, the call stack has the multiple return addresses which are stored according to the order of processing from the lowest rank (bottom) of the call stack to the highest rank of the call stack. For example, "0," "1," ... "n" are assigned as storage locations of the return addresses in order from the highest rank of the call stack, that is, in order from the return address which is processed most recently.

While the trained software is executed, the stack information acquisition unit 120 acquires system call information from the event information acquisition unit 110.

At the time of occurrence of a system call which is indicated by the system call information acquired from the event information acquisition unit 110, the stack information acquisition unit 120 stores stack information which is acquired from the call stack. Specifically, as shown in FIG. 2, the stack information acquisition unit 120 stores the return address (RA) which has been stored in the call stack at the time of occurrence of the system call (Sys) as the stack information.

For example, as shown in FIG. 2, when a system call 1 occurs, the stack information acquisition unit 120 stores return addresses (0x80000001, 0x80000123, 0x80000345) which have been stored in the call stack at the time of occurrence of the system call 1.

When a system call 2 occurs following the system call 1, the stack information acquisition unit 120 stores return addresses (0x80000001, 0x80000123, 0x80000456, 0x80000567) which have been stored in the call stack at the time of occurrence of the system call 2.

When a system call 2 occurs again following the system call 2, the stack information acquisition unit 120 stores return addresses (0x80000001, 0x80000321, 0x80000654) which have been stored in the call stack at the time of occurrence of the system call 2.

The score setting unit 125 acquires stack information from the stack information acquisition unit 120. Subsequently, the score setting unit 125 sets a score for each storage location per system call. The storage location is a location in which each element (return address) included in the stack information is stored in the call stack.

The behavior model generating unit 130 acquires system call information from the event information acquisition unit 110 and acquires stack information from the stack information acquisition unit 120. In addition, the behavior model generating unit 130 acquires the score which has been set by the score setting unit 125 for each element (return address). Subsequently, the behavior model generating unit 130 generates a behavior model of software by forming a model of a relationship between the system call and the stack information (return address). The behavior model generating unit 130 generates a behavior model for each system call.

Figure 3:
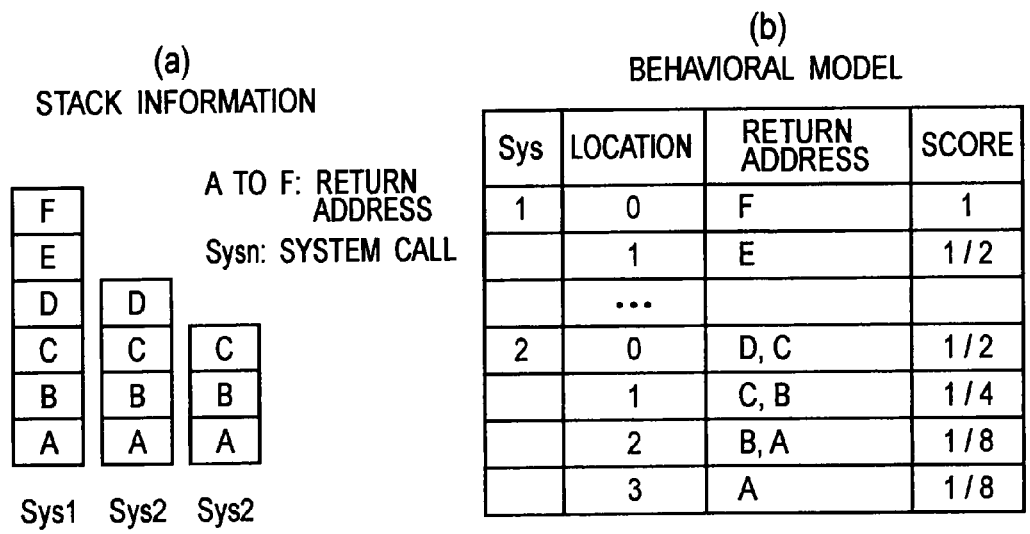
FIGS. 3 (a) and 3 (b) are views showing one example of generating a software behavior model according to the first embodiment.

A concrete description is given by taking as an example a case of generating a behavior model when a system call 1 (Sys1), a system call 2 (Sys2), and a system call 2 (Sys2) sequentially occur, as shown in FIG. 3(a).

As shown in FIG. 3(a), at the time of occurrence of the system call 1 (Sys1), return addresses A to F are stored in the call stack. It should be noted that the return address F is the one which is processed most recently and the storage location of the return address F is "0."

Similarly, at the time of occurrence of the system call 2 (Sys2) following the system call 1, return addresses A to D are sequentially stored in the call stack. It should be noted that the return address D is the one which is processed most recently and the location of the return address D is "0."

In addition, at the time of occurrence of the system call 2 (Sys2) following the system call 2 (Sys2), return addresses A to C are sequentially stored in the call stack. It should be noted that the return address C is the one which is processed most recently and the location of the return address C is "0."

As shown in FIG. 3(b), as a behavior model, the behavior model generating unit 130 generates a table in which types of system calls (Sys), storage locations of return addresses in the call stack, types of return addresses and scores are associated with one another.

Here, the above-described score setting unit 125 sets scores in such a manner that the lower the storage location, the smaller the score. In addition, the score setting unit 125 may set scores in such a manner that the larger the number of return addresses having the same type of system call and the same storage location, the smaller the score.

For example, when the storage location is "P" and the number of types of return addresses having the same type of system call and the same storage location is "N", a score (W) is set according to the following equations (1) to (4). It is assumed that the storage location is expressed by an integer equal to or larger than 0 ("0," "1," ... "n").

Here, at the storage location "0" of the system call "1," only the return address "F" is stored in the call stack, and thus the number of types N is "1." On the other hand, at the storage location "0" of the system call "2," the return addresses "D" and "C" are stored in the call stack, and thus the number of types N is "2."

$$W = -P \quad \text{Equation (1)},$$

$$W = 1/x^P \quad \text{Equation (2)},$$

$$W = 1/(N \cdot x^P) \quad \text{Equation (3)},$$

$$W = 1/(N^y \cdot x^P) \quad \text{Equation (4)},$$

where x and y are any natural numbers.

Note that, in the above-described equations (3) and (4), the number of counts (C) may be used in place of the number of types of return addresses having the same type of system call and the same storage location. Besides, the number of types (N) and the number of counts (C) may be used together.

The number of counts (C) is the number of appearances of return addresses, having the same type of system call and the same storage location, in the call stack.

For example, when the number of appearances of the return address "F" is two in the storage location "0" of the system call "1," the number of counts (C) is "2."

Note that, a score (W) is calculated by using the equation (3) in FIG. 3(b). However, it should be noted that the value of x is "2."

(Software Behavior Modeling Method)

Figure 4:
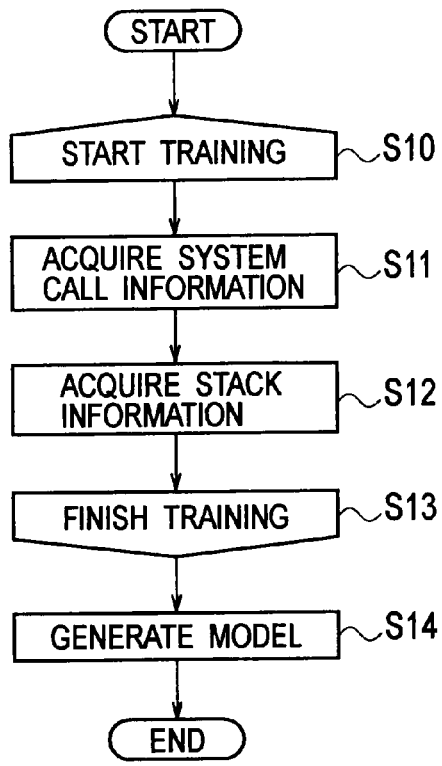
FIG. 4 is a flowchart showing a software behavior modeling method according to the first embodiment.

A software behavior modeling method according to the first embodiment is described below by referring to the drawings. FIG. 4 is a flowchart showing a software behavior modeling method according to the first embodiment. It should be noted that in FIG. 4, the description is given on the assumption that trained software runs normally. In addition, in FIG. 4, an example in which a system call occurs as a specific event is described, for example. Note that, in the example, system call information indicating a system call is acquired as event information.

As shown in FIG. 4, at step 10, the software behavior modeling device 100 starts training information necessary for generating a behavior model of trained software.

At step 11, the software behavior modeling device 100 acquires system call information indicating a system call which is issued by each process included in the trained software.

At step 12, the software behavior modeling device 100 acquires stack information (multiple return addresses) which has been stored in the call stack at the time of occurrence of the system call.

At step 13, the software behavior modeling device 100 determines if information necessary for generating a behavior model is completely acquired, for example, if execution of the trained software is finished. The software behavior modeling device 100 finishes training the information necessary for generating a behavior model of the trained software when the information necessary for generating a behavior model is completely acquired. The larger the number of normal behaviors of software, the better the necessary information. In addition, in a case where the trained software has multiple execution modes, it is judged that necessary information is completely acquired not when the software has been executed once but when the software has been executed multiple times. On the other hand, the software behavior modeling device 100 repeats the processing at step 11 and step 12 when the information necessary for generating a behavior model is not completely acquired.

At step 14, the software behavior modeling device 100 generates a behavior model of the trained software by using the system call information and the stack information. Specifically, on the basis of storage locations of return addresses and types of the return addresses, the software behavior modeling device 100 sets a score for each return address. Subsequently, as a behavior model, the software behavior modeling device 100 generates a table in which the types of system calls, storage locations of return addresses, types of return addresses and scores are associated with one another (see above-described FIG. 3(b)).

(Effects and Advantages)

In accordance with the software behavior modeling device 100 (software behavior modeling method) according to the first embodiment, the behavior model generating unit 130 generates a behavior model of trained software by using scores set according to storage locations of return addresses. The accuracy in behavior modeling of trained software can be increased by focusing attention on storage locations of return addresses in the above-described manner.

Moreover, there is no need to use difference information (virtual path) like a related art. Accordingly, it is possible to reduce a processing load on the software behavior modeling device 100 and to increase a processing speed of the software behavior modeling device 100.

In accordance with the software behavior modeling device 100 (software behavior modeling method) according to the first embodiment, a behavior model is expressed by a simple table including storage locations of return addresses and scores set according to the storage locations. Thus, the size of the behavior model can be made smaller.

Second Embodiment

Software Behavior Verification Device

Figures 5, 6:
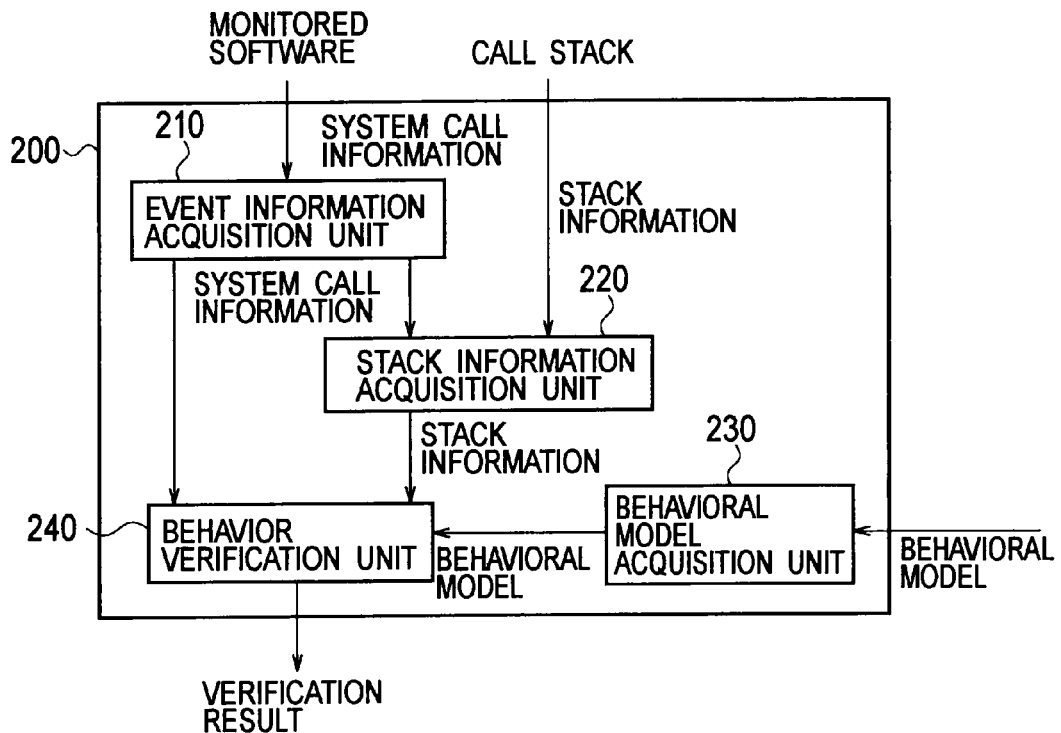
FIG. 5 is a block diagram showing the configuration of a software behavior verification device 200 according to a second embodiment.
FIGS. 6 (a) and 6 (b) are views showing one example of verifying a software behavior according to the second embodiment.

The configuration of a software behavior verification device according to a second embodiment is described below by referring to the drawings. FIG. 5 is a block diagram showing the configuration of a software behavior verification device 200 according to the second embodiment.

As shown in FIG. 5, the software behavior verification device 200 includes an event information acquisition unit 210, a stack information acquisition unit 220, a behavior model acquisition unit 230, and a behavior verification unit 240.

Similar to the event information acquisition unit 110, during execution of monitored software, the event information acquisition unit 210 acquires event information indicating a specific event which is issued by each process included in the monitored software. For example, in the following description, an example in which a system call occurs as a specific event is described. Here, in the example, the event information acquisition unit 210 acquires system call information indicating a system call as event information.

Similar to the stack information acquisition unit 120, the stack information acquisition unit 220 acquires stack information which is stored in the call stack at the time of occurrence of the system call. Similar to the first embodiment, the stack information is one in which multiple return addresses are recorded in the order of being stored in the call stack.

As shown in the first embodiment, the behavior model acquisition unit 230 acquires a behavior model generated by using the system call information and the stack information. Here, the behavior model acquisition unit 230 naturally acquires a behavior model corresponding to the monitored software.

The behavior verification unit 240 verifies if the behavior of the monitored software is different from the behavior model. Specifically, the behavior verification unit 240 focuses attention on a portion of the behavior model corresponding to the system call indicated by the system call information. Subsequently, for each storage location of return addresses, the behavior verification unit 240 compares return addresses acquired by the stack information acquisition unit 220 with return addresses included in the behavior model.

Here, when there are return addresses which coincide with each other, the behavior verification unit 240 does not add the score corresponding to the storage location to a determination value for determining if the behavior of the monitored software is normal. On the other hand, when there are no return addresses which coincide with each other, the behavior verification unit 240 cumulatively adds the score corresponding to the storage location to the determination value. When the determination value to which the score is cumulatively added exceeds a predetermined determination value, the behavior verification unit 240 determines that the behavior of the monitored software is abnormal.

For example, a description is given by exemplifying a case where the behavior model of the monitored software is a model shown in FIG. 6(a) and the return addresses which have been stored in the call stack at the time of occurrence of the system call 2 (Sys2) are addresses shown in FIG. 6(b).

The behavior verification unit 240 acquires a behavior model corresponding to the system call 2 (Sys2). Subsequently, the behavior verification unit 240 verifies if the return address G coincides with one of the return addresses included in the storage location "0" of the behavior model. In FIGS. 6 (a) and 6 (b), since the return address G does not coincide with any of the return addresses (D or C) included in the behavior model, the behavior verification unit 240 adds the score (½) corresponding to the storage location "0" to the determination value. It should be noted that the initial value of the determination value is "0."

Similarly, the behavior verification unit 240 verifies if the return address B coincides with one of the return addresses included in the storage location "1" of the behavior model. In FIGS. 6 (a) and 6 (b), since the return address B coincides with one of the return addresses (C or B) included in the behavior model, the behavior verification unit 240 does not add the score corresponding to the storage location "1" to the determination value.

Furthermore, the behavior verification unit 240 verifies if the return address A coincides with one of the return addresses included in the storage location "2" of the behavior model. In FIGS. 6 (a) and 6 (b), since the return address A coincides with one of the return addresses (B or A) included in the behavior model, the behavior verification unit 240 does not add the score corresponding to the storage location "2" to the determination value.

Subsequently, the behavior verification unit 240 uses the determination value (½ in FIGS. 6 (a) and 6 (b)) to which the score is cumulatively added as a cumulative score of the stack information, the cumulative score being calculated for each of the multiple pieces of stack information, and adds the cumulative score to an anomaly score.

Lastly, the behavior verification unit 240 determines if the anomaly score exceeds the predetermined determination value and determines if the behavior of the monitored software is normal. Here, the predetermined value is a value which is set in advance and is any number including 0. Also, a value of the increase rate of the anomaly score may be utilized for determination.

Note that, the cumulative score may be normalized according to the number of issues of system calls. In addition, whether the behavior of the monitored software is normal may be determined by a total (cumulative value) of the determination values corresponding to the predetermined number of system calls. For example, if the predetermined number is five, a total (cumulative value) of the determination values corresponding to the system calls at the first issue to fifth issue, a total (cumulative value) of the determination values corresponding to the system calls at the second issue to the sixth issue, a total (cumulative value) of the determination values corresponding to the system calls at the third issue to the seventh issue are respectively calculated. Thereafter, it is determined based on the cumulative values if the behavior of the monitored software is normal.

(Software Behavior Verification Method)

Figure 7:
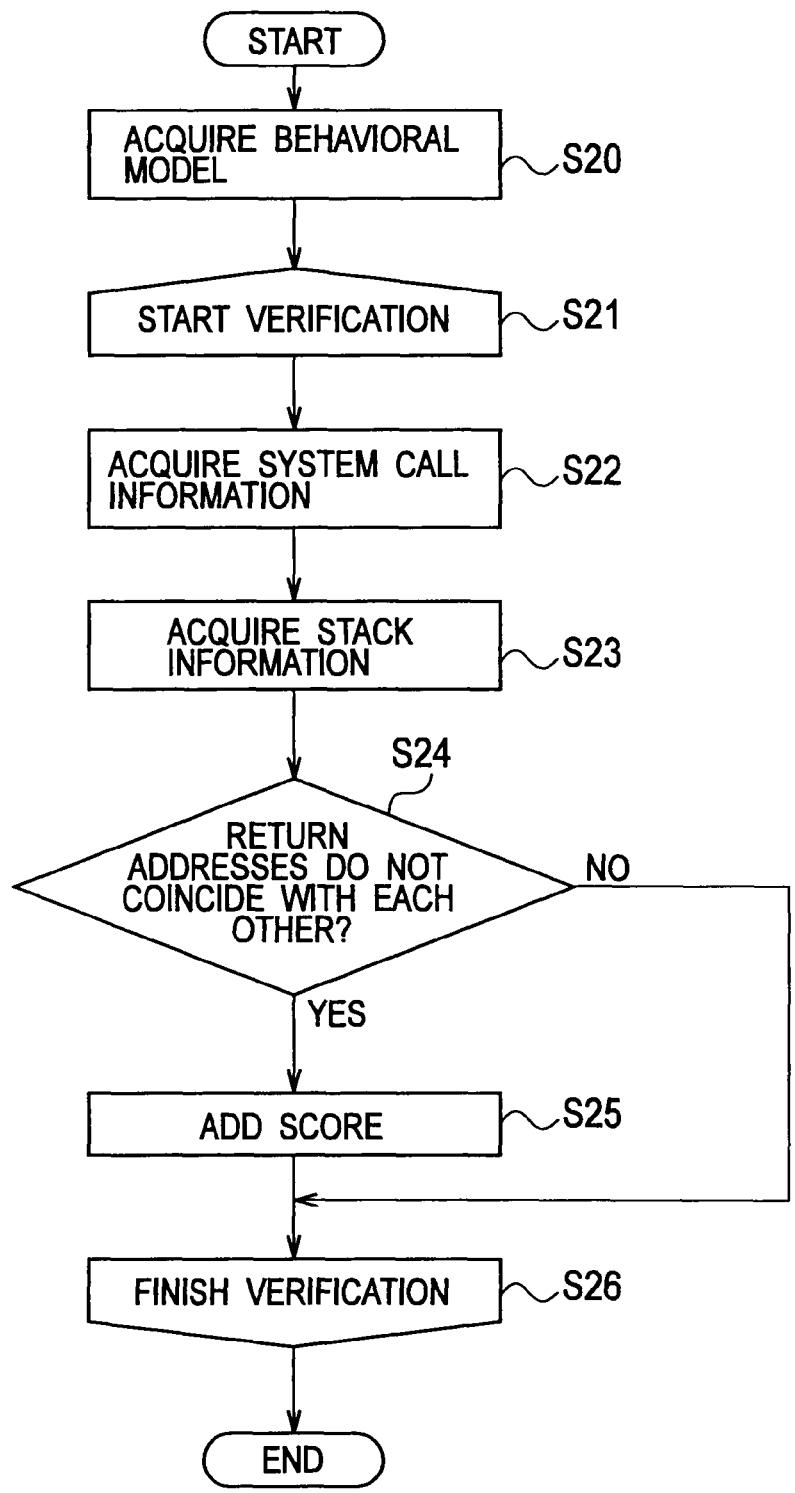
FIG. 7 is a flowchart showing a software behavior verification method according to the second embodiment.

A software behavior verification method according to the second embodiment is described below by referring to the drawings. FIG. 7 is a flowchart showing a software behavior verification method according to the second embodiment. In FIG. 7, the description is given of an example in which a system call occurs as a specific event. Note that, in the example, system call information indicating a system call is acquired as event information.

As shown in FIG. 7, at step 20, the software behavior verification device 200 acquires a behavior model of monitored software (see, the above-described FIG. 6(a)).

At step 21, the software behavior verification device 200 starts monitoring the monitored software.

At step 22, the software behavior verification device 200 acquires system call information indicating a system call which is issued by each process included in the monitored software.

At step 23, the software behavior verification device 200 acquires stack information (multiple return addresses) which has been stored in the call stack at the time of occurrence of the system call.

At step 24, the software behavior verification device 200 refers to the behavior model corresponding to the system call information. Then, for each storage location of the return addresses, the software behavior verification device 200 determines if each of the return addresses acquired at step 23 coincides with any of the return addresses included in the behavior model. In addition, the software behavior verification device 200 proceeds to processing at step 26 when there are return addresses which coincide with each other and proceeds to processing at step 25 when there are no return addresses which coincide with each other.

At step S25, the software behavior verification device 200 adds the score corresponding to the storage location of the return address to the determination value.

At step 26, the software behavior verification device 200 determines if the determination value exceeds the predetermined determination value and if execution of the monitored software is finished. The software behavior verification device 200 determines that the behavior of the monitored software is abnormal when the determination value exceeds the predetermined determination value. On the other hand, when the execution of the monitored software is finished, the software behavior verification device 200 determines that the behavior of the monitored software is normal.

Note that, the software behavior verification device 200 repeats the processing at step 22 to step 25 when the determination value does not exceed the predetermined determination value and the execution of the monitored software is not finished.

(Effects and Advantages)

In accordance with the software behavior verification device 200 (software behavior verification method) according to the second embodiment, the behavior verification unit 240 uses the score which is set according to the storage location of the return address so as to determine if the behavior of the monitored software is different from the behavior model. As described above, the verification accuracy of the behavior of the monitored software can be increased by focusing attention on the storage location of the return address.

Moreover, there is no need to use difference information (virtual path) like a related art. Accordingly, it is possible to reduce a processing load on the software behavior verification device 200 and to improve a processing speed of the software behavior verification device 200.

In accordance with the software behavior verification device 200 (software behavior verification method) according to the second embodiment, the behavior verification unit 240 compares the return address which is stored in the call stack with the return address which is included in the behavior model for each storage location. Then, when the return addresses do not coincide with each other, the behavior verification unit 240 cumulatively adds the score. The behavior verification unit 240 verifies the behavior of the monitored software based on the cumulatively added score (determination value). Accordingly, an anomaly of the software can be detected even when software which is totally unknown to the software behavior verification device 200 is executed by an attack of an attacker.

Other Embodiments

The present invention has been described by using the above-described embodiments. However, it should not be understood that the description and the drawings, which constitute one part of this disclosure, are to limit the present invention. Various alternative embodiments, examples, and operational techniques will be obvious for those skilled in the art from this disclosure.

For example, although it is not particularly described in the above-described embodiments, the score setting unit 125 and the behavior model generating unit 130 may extract modeling object return addresses to be used for generating a behavior model from return addresses stored in the call stack, and generate a behavior model of a training object model by using scores set according to storage locations of the modeling object return addresses.

Here, the modeling object return addresses may be a predetermined number of return addresses which are extracted from the return addresses stored in the call stack in order from the highest rank of the call stack. In addition, among the return addresses stored in the call stack, the modeling object return address may be a return address whose score is equal to or larger than a predetermined threshold.

In the above-described embodiments, the score setting unit 125 sets a score corresponding to one return address in a relationship between one system call and one return address. However, the present invention is not limited to this. In other words, the behavior model generating unit 130 forms a model of the relationship between one system call and one return address, but the present invention is not limited to this.

Specifically, the score setting unit 125 may set a score corresponding to multiple return addresses in a relationship between one system call and the permutation of the multiple return addresses, the permutation taking into account the order of the multiple return addresses starting from the highest rank of the call stack. In other words, the behavior model generating unit 130 may form a model of the relationship between one system call and the permutation of the multiple return addresses, the permutation taking into account the order of the multiple return addresses starting from the highest rank of the call stack.

Although it is not particularly described in the above-described embodiments, the score setting unit 125 may set a score to the return address having stored in the call stack at the time of occurrence of the system call while taking into account the rate of the number of appearances of the return address within the system call.

Although it is not particularly described in the above-described embodiments, the score setting unit 125 may set a score by taking into account a correlation of multiple return addresses.

For example, in a case where the correlation between the return address A and the return address B is high, when the return address B appears in one location together with the return address A and when the return address A is different from the model, a low score may be set for the one location. In addition, the return address B does not need to be examined when the rerun address A appears. Alternatively, the return address A does not need to be examined when the rerun address B appears.

INDUSTRIAL APPLICABILITY

As described above, a software behavior modeling device, software behavior modeling method, software behavior verification device, and software behavior verification method according to the present invention can readily verify the behavior of software while keeping a verification accuracy of the behavior of the software, and are therefore useful.

The invention claimed is:

1. A software behavior modeling device which forms a model of a behavior of software, comprising:
    a processor;
    an event information acquisition unit, implemented by the processor, configured to acquire event information indicating a specific event which occurs during execution of the software;
    a stack information acquisition unit, implemented by the processor, configured to acquire stack information for a plurality of elements stored in a call stack at a time of occurrence of the specific event;
    a score setting unit, implemented by the processor, configured to set a score which varies in accordance with a storage location in which each element included in the stack information is stored in the call stack; and
    a model generating unit, implemented by the processor, configured to form a model of a relationship between the specific event and each element included in the stack information by using the score, and to generate a behavior model of the software.

2. The software behavior modeling device according to claim 1, wherein the model generating unit extracts modeling object elements to be used for generating the behavior model from the elements stored in the call stack, and generates the behavior model by using the storage location and the score corresponding to the modeling object element.

3. The software behavior modeling device according to claim 2, wherein the modeling object elements are a predetermined number of elements which are extracted in descending order from the elements stored in the call stack.

4. The software behavior modeling device according to claim 2, wherein the modeling object elements are elements, whose scores are not less than a predetermined threshold, among the elements stored in the call stack.

5. The software behavior modeling device according to claim 1, wherein the model generating unit forms a model of a relationship between the specific event and a processing order of the elements so as to generate the behavior model.

6. The software behavior modeling device according to claim 1, wherein an arrangement of the storage locations in the call stack corresponds to an order of processing the specific event, and the score setting unit sets a highest score to the storage location corresponding to the element which is processed most recently.

7. A software behavior modeling method for forming a model of a behavior of software, comprising:
    acquiring event information indicating a specific event which occurs during execution of the software;
    acquiring stack information for a plurality of elements stored in a call stack at a time of occurrence of the specific event;
    setting a score which varies in accordance with a storage location in which each element included in the stack information is stored in the call stack; and forming a model of a relationship between the specific event and each element included in the stack information by using the score and thereby generating a behavior model of the software.

8. A software behavior verification device which verifies a behavior of software, comprising:
- a processor;
- an event information acquisition unit, implemented by the processor, configured to acquire event information indicating a specific event which occurs during execution of the software;
- a stack information acquisition unit, implemented by the processor, configured to acquire stack information for a plurality of elements stored in a call stack at a time of occurrence of the specific event;
- a behavior model acquisition unit, implemented by the processor, configured to acquire a behavior model in which a model of a relationship between the specific event and each element included in the stack information is formed in advance; and
- a behavior verification unit, implemented by the processor, configured to verify if the behavior of the software is different from the behavior model, based on the specific event acquired by the event information acquisition unit and the stack information acquired by the stack information acquisition unit,
- wherein the behavior model is generated by using a score which varies in accordance with a storage location where each element included in the stack information is stored in the call stack when the software is normally executed in advance, and
- the behavior verification unit verifies if the behavior of the software is different from the behavior model, based on the score.

9. The software behavior verification device according to claim 8, wherein the behavior verification unit cumulatively adds the score and detects an abnormal behavior of the software based on the cumulatively added score.

10. A software behavior verification method for verifying a behavior of software, comprising:
- a step A of acquiring event information indicating a specific event which occurs during execution of the software;
- a step B of acquiring stack information for a plurality of elements stored in a call stack at a time of occurrence of the specific event;
- a step C of acquiring a behavior model in which a model of a relationship between the specific event and each element included in the stack information is formed in advance; and
- a step D of verifying if the behavior of the software is different from the behavior model, based on the specific event acquired at the step A and the stack information acquired at step B,
- wherein the behavior model is generated by using a score which varies in accordance with a storage location where each element included in the stack information is stored in the call stack when the software is normally executed in advance, and
- at the step D, it is verified if the behavior of the software is different from the behavior model, based on the score.

* * * * *